United States Patent Office 2,914,562
Patented Nov. 24, 1959

2,914,562

AMINE DERIVATIVES OF TRIPHENYLETHANOL

Robert E. Allen, Wyoming, and Frank P. Palopoli and Edward L. Schumann, Cincinnati, Ohio, and Marcus G. Van Campen, Jr., Berkeley, Calif., assignors to The Wm. S. Merrell Company No Drawing. Application August 6, 1957
Serial No. 676,478

4 Claims. (Cl. 260—570)

Our invention relates to new chemical compounds which may be regarded as derivatives of triphenylethanol. They are distinguished, in general, by their anti-estrogenic activity in the endocrine system, anti-inflammatory activity and gonadotrophic activity and activity in decreasing blood cholesterol levels. Some of the compounds possess various combinations of these properties.

As estrogen antagonists the compounds are useful in the treatment of hyperestrogenism and disorders related to this condition, e.g., endometriosis, Kleinfelter's syndrome, dysmenorrhea, menopausal dysfunction, functional bleeding, and similar conditions. They are active both orally and parenterally and so can be administered by either route, though the oral route is preferred in most instances. Some of the compounds have a high degree of activity as estrogen antagonists and are also advantageously non-estrogenic. Some of the compounds with anti-estrogenic activity are also uterotrophic.

As anti-inflammatory agents the compounds are useful in alleviating the symptoms of such collagen diseases as arthritis and rheumatism and in the topical treatment of inflammation. Some of the compounds possess the novel combination of anti-inflammatory and anti-estrogenic activities and are especially advantageous for this reason.

In decreasing blood cholesterol levels the compounds are useful in the treatment of atherosclerosis.

As gonadotrophic inhibition agents the compounds are useful for the treatment of fertility and sterility problems and can be administered orally or parenterally for this purpose.

The compounds can be used orally and parenterally in doses ranging between 25 mg. and 2–4 grams daily depending on the condition under treatment. For topical use the compounds can be incorporated into creams, ointments or lotions in concentrations of up to 10 percent. In aerosol sprays the concentration can be in the order of about 0.05 to 1 percent.

The ethanols dehydrate rather easily in the presence of acid and can be used as the base. They do not appear to be affected by gastric acid following oral administration, but can be better protected against such acid by being incorporated in enteric coated tablets or by the use of buffers such as aluminum hydroxide, calcium carbonate, magnesium trisilicate and the like, when liquid preparations for oral use are desired. Some of the ethanols can be isolated and used in the form of their water soluble salts or organic acids such as citric acid. The ethanols can also be isolated and used in the form of their quaternary salts with quaternizing agents such as lower alkyl halides, e.g., methyl bromide and ethyl bromide. Such salts are useful for special purposes.

The compounds of our invention are derivatives of triphenyl ethanols in which one of the phenyl groups is substituted by a basic ether group of the formula described below and in which the mono-phenyl substituted carbon atom in the ethanol group is linked to hydrogen. The new compounds have the formula

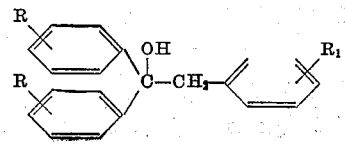

in which one of the groups represented by R is a basic ether group of the formula $-OC_nH_{2n}A$, wherein $n$ is 2, 3 or 4 and A is an amino group or an alkylamino or dialkylamino group in which the alkyl groups contain from 1 to 4 carbon atoms. The group $-OC_nH_{2n}A$ is attached to the benzene ring by the oxygen atom in the meta or para position to the point of attachment of the benzene ring to the ethanol group. The benzene nucleus substituted with the $-OC_nH_{2n}A$ group must be attached to a carbon atom bearing a second benzene nucleus. The remaining R group and the $R_1$ group are hydrogen, halogen, methyl or methoxy provided, however, that at least one of these groups is halogen, methyl or methoxy.

The new ethanols in which A is a dialkylamino group can be prepared by reacting a substituted benzylmagnesium bromide or chloride with a benzophenone substituted with a $-OC_nH_{2n}A$ group. The benzophenone is obtained by reacting an alkali metal salt of a hydroxybenzophenone with a halide such as a dialkylaminoalkyl bromide or chloride. The new ethanols in which A is a dialkylamino group can also be prepared by first preparing the corresponding ethanol containing a $-OC_nH_{2n}X$ group (where X is halogen) and reacting this ethanol with lithium dialkylamide. The ethanol containing the $-OC_nH_{2n}X$ group can be prepared by reacting an alkali metal salt of a hydroxybenzophenone with an alkyl dihalide to form a benzophenone containing a $-OC_nH_{2n}X$ group followed by reaction with a substituted benzylmagnesium bromide or chloride.

The new ethanols in which A is an alkylamino group are prepared by preparing a similar ethanol and treating with an alkylamine.

The new ethanols in which A is an amino group ($NH_2$) can be prepared from ethanols corresponding to those described above except that A of the ethanols is a dibenzyl amino group. The dibenzyl groups can be removed by catalytic hydrogenolysis to obtain the amino group. The ethanols in which A is a dibenzyl amino group can be prepared by the reaction of a substituted benzylmagnesium chloride or bromide with a benzophenone substituted with a $-OC_nH_{2n}[N(PhCH_2)_2]$ group. The benzophenone can be obtained by the reaction of an alkali metal salt of a hydroxy benzophenone with a halide such as a dibenzyl aminoalkyl bromide or chloride.

The compounds of our invention will be further illustrated by reference to the following examples.

EXAMPLE 1

*1-[p-(β-diethylaminoethoxy)phenyl]-1-phenyl-2-p-anisylethanol*

One liter of a 0.45 N ethereal solution of p-methoxybenzylmagnesium chloride was added in 30 minutes to a stirred solution of 104 gm. (0.35 mole) of 4-(β-diethylaminoethoxy)-benzophenone in 400 ml. of dry ether. After stirring an additional hour, the mixture was decomposed by pouring onto one liter of cold 10 percent ammonium chloride solution, the ether solution was washed with water, and the ether was replaced with hot isopropanol containing a trace of ammonia. 1-[p-(β - diethylaminoethoxy)phenyl]-1-phenyl-2-p-anisylethanol separated as white crystals, melting at 104–106° C.

This compound exhibits non-estrogenic estrogen antagonist and anti-inflammatory activities.

The 4-(β-diethylaminoethoxy)benzophenone was prepared as follows: a mixture of 200 gm. of 4-hydroxybenzophenone, 55 gm. of powdered sodium methoxide and 400 ml. of ethanol was stirred for 30 minutes. A solution of 150 gm. of β-diethylaminoethyl chloride in 300 ml. of toluene was added and the mixture was refluxed four hours. The solvent was removed, the residue was taken up in ether, extracted with 5 percent NaOH solution, twice with water, the ether was removed and the residue was distilled. The product was obtained as an oil boiling at 200–204° C. at 0.7 mm.

EXAMPLE 2

*1-[m-(β-diethylaminoethoxy)phenyl]-1-phenyl-2-p-anisylethanol*

When the procedure of Example 1 was followed, using 3-hydroxybenzophenone in place of 4-hydroxybenzophenone, 1-[m-(β-diethylaminoethoxy)phenyl]-1-phenyl-2-p-anisylethanol was obtained as an oil whose dihydrogen citrate salt melted at 91–3 C.

This compound exhibits non-estrogenic uterotrophic and anti-inflammatory activities.

The 3-(β-diethylaminoethoxy)benzophenone obtained from the 3-hydroxybenzophenone boiled at 173° C. at 0.35 mm.

EXAMPLE 3

*1-[p-(β-dimethylaminoethoxy)phenyl]-1-phenyl-2-p-bromophenylethanol*

To the Grignard prepared from 60 g. of p-bromobenzyl bromide in 600 ml. of dry ether and 5.9 g. of magnesium ribbon in 50 ml. of dry ether was added a solution of 52 g. of 4-(β-dimethylaminoethoxy)benzophenone in 200 ml. each of dry ether and dry benzene. After stirring 2 hours and decomposing in an excess of 10% ammonium chloride solution, the ethereal solution was dried over anhydrous magnesium sulfate, the solvent was removed and the oily residue was covered with ligroin. The crystals which form were recrystallized twice from benzene to give 1-[p-(β-dimethylaminoethoxy)phenyl]-1-phenyl-2-p-bromophenylethanol, melting at 104–106° C.

This compound exhibits anti-inflammatory activity and activity in decreasing blood cholesterol levels.

The 4-(β-dimethylaminoethoxy)benzophenone was prepared according to the procedure of Example 1 using β-dimethylaminoethyl chloride instead of β-diethylaminoethyl chloride. The 4-(β-dimethylaminoethoxy)benzophenone boiled at 176–180° C. at 0.3 mm.

EXAMPLE 4

*1-[p-(β-diethylaminoethoxy)phenyl]-1-phenyl-2-p-chlorophenylethanol*

When p-chlorobenzylmagnesium chloride replaced p-methoxybenzylmagnesium chloride of Example 1 in the procedure of Example 1, 1-[p-(β-diethylaminoethoxy)phenyl]-1-phenyl-2-p-chlorophenylethanol was obtained, melting at 116–7° C.

This compound exhibits non-estrogenic uterotrophic estrogen antagonist and anti-inflammatory activities and activity in decreasing blood cholesterol levels. It is devoid of gonadotrophic inhibitory and anti-androgenic activity.

EXAMPLE 5

*1-[p-(β-diethylaminoethoxy)phenyl]-1-phenyl-2-p-tolylethanol*

Using the procedure of Example 1 but replacing the Grignard reagent of Example 1 with p-methylbenzylmagnesium chloride, 1-[p-(β-diethylaminoethoxy)phenyl]-1-phenyl-2-p-tolylethanol was obtained, melting at 91–2° C.

This compound exhibits uterotrophic estrogen antagonist and anti-inflammatory activities. It is moderately potent in decreasing blood cholesterol levels.

EXAMPLE 6

*1-[p-(β-diethylaminoethoxy)phenyl]-1-p-chlorophenyl-2-p-anisylethanol*

When the 4-hydroxybenzophenone was replaced with 4-hydroxy-4'-chlorobenzophenone in Example 1, 4-(β-diethylamino)ethoxy-4'-chlorobenzophenone was obtained, melting at 79–80° C. (from ethanol). This ketone, when treated with p-methoxy-benzylmagnesium chloride gave 1-[p-(β-diethylaminoethoxy)phenyl]-1-p-chlorophenyl-2-p-anisylethanol, melting at 125° C.

This compound exhibits weakly estrogenic uterotrophic estrogen antagonist and anti-inflammatory (including dextran edema and ultraviolet erythema) activities and activity in decreasing blood cholesterol levels.

EXAMPLE 7

*1-[p-(β-diethylaminoethoxy)phenyl]-1-p-tolyl-2-phenylethanol*

When 4-hydroxy-4'-methylbenzophenone replaced 4-hydroxybenzophenone in Example 1, 4-(β-diethylaminoethoxy)-4'-methylbenzophenone was obtained, boiling at about 232° C. at 0.6 mm. This ketone, when treated with benzylmagnesium chloride, gave 1-[p-(β-diethylaminoethoxy)phenyl]-1-p-tolyl-2-phenylethanol. The product had a melting point of 106.5–108.5° C.

This compound exhibits non-estrogenic uterotrophic and anti-inflammatory activities and activity in decreasing blood cholesterol levels.

EXAMPLE 8

*1-[p-(β-diethylaminoethoxy)phenyl]-1-p-tolyl-2-p-anisylethanol*

When the basic ether ketone of Example 7 was treated with p-methoxybenzylmagnesium chloride according to the method of Example 1, 1-[p-(β-diethylaminoethoxy)phenyl]-1-p-tolyl-2-p-anisylethanol was obtained. The product had a melting point of 99–101° C.

This compound exhibits anti-inflammatory activity and potent activity in decreasing blood cholesterol levels.

EXAMPLE 9

*1-[p-(β-diethylaminoethoxy)phenyl]-1-p-tolyl-2-p-chlorophenylethanol*

Replacing the Grignard reagent of Example 7 with p-chlorobenzylmagnesium chloride in the procedure of Example 7, gave 1-[p-(β-diethylaminoethoxy)phenyl]-1-p-tolyl-2-p-chlorophenylethanol. The product had a melting point of 102–104° C.

This compound exhibits non-estrogenic uterotrophic estrogen antagonist and anti-inflammatory activities and also activity in decreasing blood cholesterol levels.

EXAMPLE 10

*1-[p-(β-dimethylaminoethoxy)phenyl]-1-phenyl-2-p-anisylethanol*

Treatment of 4-(β-dimethylaminoethoxy)benzophenone with the Grignard reagent of Example 1 as in the procedure of Example 1, gave 1-[p-(β-dimethylaminoethoxy)phenyl]-1-phenyl-2-p-anisylethanol, melting at 122–3° C.

This compound exhibits non-estrogenic uterotrophic estrogen antagonist and anti-inflammatory activities and also activity in decreasing blood cholesterol levels.

EXAMPLE 11

*1-[p-(β-di-n-butylaminoethoxy)phenyl]-1-phenyl-2-p-anisylethanol*

When β-di-n-butylaminoethyl chloride replaced β-diethylaminoethyl chloride in Example 1, 4-(β-di-n-butylaminoethoxy)benzophenone, boiling at 209° C. at 0.3 mm., was obtained. Treatment of this ketone as described in Example 1 gave 1-[p-(β-di-n-butylaminoethoxy)phenyl]-1-phenyl-2-p-anisylethanol, melting at 63–4° C.

This compound exhibits non-estrogenic uterotrophic estrogen antagonist activity.

EXAMPLE 12

*1-[p-(β-aminoethoxy)phenyl]-1-phenyl-2-p-anisylethanol*

A solution of β-dibenzylaminoethyl chloride in 200 ml. of toluene (prepared from 100 grams of the HCl salt and excess potassium hydroxide solution) was added to a mixture of 67 grams of 4-hydroxybenzophenone and 19 grams of sodium methoxide in 300 ml. of ethanol during stirring and refluxing. After a period of 6 hours of refluxing, the solvent was removed, and an ether extract of the residue was washed with an excess of 10% sodium hydroxide solution and then water. The ether layer was then concentrated on the steam bath, and crystals of 4-(β-dibenzylamino) ethoxybenzophenone were obtained, melting at 101–102° C. This ketone (87 grams) was suspended in 400 ml. of dry ether, and 500 ml. of an ether solution containing 0.20 moles of p-methoxybenzylmagnesium chloride was added, and the mixture was stirred for 3 hours. An excess of 10% ammonium chloride solution was added with stirring.

The ether layer was separated and concentrated on the steam bath. The only residue was dissolved in 500 ml. of ethanol and added to 12 grams of palladium on charcoal catalyst; the mixture was then hydrogenated at about 3 atmospheres pressure until about 2 mole equivalents of hydrogen was absorbed. The mixture was filtered, the filtrate concentrated on the steam bath, and ether added to oily residue. Crystals of 1-[p-(β-aminoethoxy)phenyl]-1-phenyl-2-p-anisylethanol were obtained, melting at 131.5°–132.5° C.

This compound exhibits uterotrophic estrogen antagonist and anti-inflammatory activities.

EXAMPLE 13

*1-[p-(β-dimethylaminoisopropoxy)phenyl]-1-phenyl-2-p-anisylethanol*

When 1-dimethylamino-2-chloropropane was substituted for the β-diethylaminoethyl chloride in Example 1, 4-(β-dimethylaminoisopropoxy)benzophenone was obtained, boiling at 193° C. at 1.2 mm. Treatment with the Grignard reagent as in Example 1 gave 1-[p-(β-dimethylaminoisopropoxy)phenyl] - 1 - phenyl - 2 - p-anisylethanol, an oil, which formed an oxalate salt, melting at 155–161° C.

This compound exhibits estrogenic estrogen antagonist and anti-inflammatory activities.

EXAMPLE 14

*1-[p-(δ-diethylaminobutoxy)phenyl]-1-phenyl-2-p-anisylethanol*

A mixture of 100 gm. of 4-hydroxybenzophenone and 27 gm. of powdered sodium methoxide in 400 ml. of ethanol was stirred for thirty minutes, 250 gm. of 1,4-dichlorobutane was added and the mixture was refluxed for 17 hours. The solvent was removed and the residue was taken up in ether, washed with 5 percent sodium hydroxide solution, twice with water and the product was distilled, giving 4-(δ-chlorobutoxy)benzophenone, 204° C. at 0.3 mm.

When this ketone was treated with p-methoxybenzylmagnesium chloride as in Example 1, 1-[p-(δ-chlorobutoxy)phenyl]-1-phenyl-2-p-anisylethanol was obtained, M.P. 110–112° C.

An ethereal solution of butyllithium was treated with an ethereal solution of diethylamine so as to obtain an equivalent of lithium diethylamide. A solution of 0.4 equivalent of the 1-[p-(δ-chlorobutoxy)phenyl]-1-phenyl-2-p-anisylethanol in benzene was added and the mixture was refluxed 16 hours. After decomposing with 10% ammonium chloride solution and removing the solvent, the residue was allowed to react with a solution of citric acid in ethanol. The white crystals so obtained were recrystallized from butanone to give 1-[p-(δ-diethylaminobutoxy)phenyl]-1-phenyl-2-p-anisylethanol as the dihydrogen citrate salt, M.P. 87–89° C.

This compound exhibits estrogenic estrogen antagonist and anti-inflammatory activities.

EXAMPLE 15

*1-[p-(β-methylaminoethoxy)phenyl]-1-phenyl-2-p-anisylethanol*

When ethylene chlorobromide replaced 1,4-dichlorobutane in the procedure of Example 14, 4-(β-chloroethoxy)benzophenone was obtained, melting at 78° C. (from ether). Treatment of this ketone as in Example 14 with p-methoxybenzylmagnesium chloride gave 1-[p-(β-chloroethoxy)phenyl]-1-phenyl-2-p-anisylethanol, melting at 103° C. (from methanol). A mixture of 45 gm. of this product, 21 gm. of methylamine and 240 ml. of absolute ethanol was heated in a pressure bottle at 56° C. for three days. Cooled, the desired product, 1-[p-(β-methylaminoethoxy)phenyl] - 1 - phenyl - 2 - p - anisylethanol, separated, melting at 156° C. An additional quantity can be obtained by removing the solvent, washing the residue with water, 10 percent sodium hydroxide, then water and repeated washings with methylene chloride followed by a crystallization from a mixture of chloroform and ethanol.

This compound exhibits uterotrophic estrogen antagonist and anti-inflammatory activities.

EXAMPLE 16

*1-[p-(β-diethylaminoethoxy)phenyl]-1-p-tolyl-2-p-fluorophenylethanol*

To the Grignard reagent prepared from 7.0 g. of p-fluorobenzyl chloride and 1.2 g. of magnesium metal, there was added in 1 hour 10 g. of 4-(β-dimethylaminoethoxy)-4'-methyl-benzophenone dissolved in 130 ml. of ether. After standing overnight, the mixture was decomposed by the dropwise addition of a saturated ammonium chloride solution, and the ether layer separated, washed with water, and dried over potassium carbonate. The ether was removed under vacuum and replaced with 2-propanol from which 1-[p-(β-diethylamino-ethoxy)phenyl]-1-p-tolyl-2-p-fluorophenylethanol separates as white crystals, melting point 107–108° C.

This compound exhibits uterotrophic and anti-inflammatory activities and activity in decreasing blood cholesterol levels.

EXAMPLE 17

*1-[p-(β-diethylaminoethoxy)phenyl]-1-p-chlorophenyl-2-phenylethanol*

By replacing the p-methoxybenzylmagnesuim chloride of Example 6 with benzylmagnesium chloride and following the procedure of Example 6, 1-[p-(β-diethylaminoethoxy)phenyl]-1-p-chlorophenyl-2-phenylethanol was obtained, melting at 121–2° C.

This compound exhibits uterotrophic estrogen antagonist, gonadotrophic inhibitory and anti-inflammatory activities and activity in decreasing blood cholesterol levels.

EXAMPLE 18

*1-[p-(β-diethylaminoethoxy)phenyl]-1,2-bis(p-chlorophenyl)-ethanol*

By replacing the Grignard reagent of Example 17 with p-chlorobenzylmagnesium chloride and by using the procedure of Example 17 1-[p-(β-diethylaminoethoxy)phenyl]-1,2-bis(p-chlorophenyl)-ethanol was obtained, M.P. 128–130° C.

This compound exhibits anti-inflammatory activity and activity in decreasing blood cholesterol levels.

EXAMPLE 19

*1-[p-(β-diethylaminoethoxy)phenyl]-1-phenyl-2-p-fluorophenylethanol*

When the ketone of Example 16 was replaced with 4-(β-diethylaminoethoxy)-benzophenone then 1-[p-(β-diethylaminoethoxy)phenyl] - 1 - phenyl - 2 - p - fluorophenylethanol was obtained, melting at 119–120° C.

This compound exhibits uterotrophic estrogen antagonist and anti-inflammatory activities and activity in decreasing blood cholesterol levels.

EXAMPLE 20

*1-[p-(β-diethylaminoethoxy)phenyl]-1-p-tolyl-2-p-chlorophenylethanol ethobromide*

A mixture of 10 g. of 1-[p-(β-diethylaminoethoxy)phenyl]-1-p-tolyl-2-p-chlorophenylethanol and 5 ml. of ethyl bromide in 50 ml. of ethanol was heated in a pressure flask at 75° C. for 20 hours. The solvent was removed, dry ether was added to the residual oil, and the solid which formed was recrystallized from a mixture of isopropanol and ethyl acetate to give 1-[p-(β-diethylaminoethoxy)phenyl] - 1 - p - tolyl - 2 - p - chlorophenylethanol ethobromide, melting at 202° C. (with decomposition).

EXAMPLE 21

*1-[p-(β-diethylaminoethoxy)phenyl]-1-phenyl-2-p-anisylethanol ethobromide*

A solution of 8.2 g. of 1-[p-(β-diethylaminoethoxy)phenyl]-1-phenyl-2-p-anisylethanol and 4.4 g. of ethyl bromide in 100 cc. of chloroform was heated for 3 hours at 100° C. in a pressure bottle. After evaporation of the chloroform, the residue was rubbed under dry ether until solid. The hygroscopic solid was recrystallized from butanone-dry ether and then dried over $P_2O_5$ at 50° C. and 0.2 mm. pressure for 12 hours to give 3 grams of 1-[p - (β - diethylaminoethoxy)phenyl] - 1 - phenyl - 2 - p - anisylethanol ethobromide, melting at 93–97° C.

This compound has anti-inflammatory activity.

All of the compounds of the above examples exhibited the activities described for each when administered parenterally (subcutaneously). Also, the compound of Example 1 exhibited estrogen antagonist activity when administered orally. Also, the compounds of Examples 1, 5 and 13 exhibited anti-inflammatory activity when administered orally and Examples 6 and 17 when administered topically.

The following examples illustrate suitable pharmaceutical compositions containing the new compounds. In these examples, the quantities are given for single units, it being understood that in actual practice, the dosage forms will be prepared in suitable quantities, and the amounts of materials used adjusted accordingly.

EXAMPLE 22

*25 mg. tablets.*—25 mg. of 1-[p-(β-diethylaminoethoxy)phenyl]-1-p-tolyl-2-phenylethanol (Example 7), 48 mg. of powdered sugar, and 32 mg. of corn starch are mixed and granulated with 10 percent gelatin solution. The granulation is dried and ground to fine granules for tableting. About 1 percent magnesium stearate is added as a lubricant together with sufficient corn starch to give a weight of 2.5 grains per tablet. The product is compressed on a single punch or rotary machine using a 9/32 inch punch.

EXAMPLE 23

*500 mg. tablets.*—500 mg. of 1-[p-(β-diethylaminoethoxy)phenyl]-1-p-tolyl-2-phenylethanol (Example 7) in finely powdered form is admixed with 60 mg. of corn starch and 100 mg. of powdered sugar and then granulated with 10 percent gelatin solution. The granulation is dried and ground to size suitable for tableting. About 1 percent magnesium stearate is added as a lubricant, together with sufficient corn starch to give a weight of 700 mg. per tablet. The product is compressed on a single punch or rotary machine using a 7/16 inch punch.

The tablets of Example 22 and Example 23 may be suitably coated if desired, as, for example, with sugar.

EXAMPLE 24

*Capsule.*—25 mg. of 1-[p-(β-diethylaminoethoxy)phenyl]-1-p-tolyl-2-p-chlorophenylethanol (Example 9) is admixed with corn starch in quantity required to provide sufficient bulk for the desired size capsule, and the mixture is encapsulated.

EXAMPLE 25

*Capsule.*—500 mg. of 1-[p-(β-diethylaminoethoxy)phenyl]-1-p-tolyl-2-p-chlorophenylethanol (Example 9) is admixed with sufficient corn starch to give the proper bulk for the desired size capsule, and the mixture is encapsulated.

EXAMPLE 26

*Injectable suspension, 100 mg. per ml.*—The following ingredients are sterilized separately: 100 mg. of 1-[p-(β - diethylaminoethoxy)phenyl] - 1 - p - tolyl - 2 - phenylethanol (Example 7), 0.1 mg. of Tween 80 and q.s. corn oil to make a final volume of one ml. These ingredients are admixed aseptically. Particle size may be achieved by use of micronized material or by use of a ball mill, maintaining aseptic conditions. The above suspension may be administered subcutaneously and intramuscularly.

EXAMPLE 27

*Oral suspension, 700 mg. per 15 ml.*—150 mg. of Veegum H.V. are hydrated in about 9 ml. of water; 500 mg. of Tween 80, 700 mg. of 1-[p-(β-diethylaminoethoxy)phenyl]-1-p-tolyl-2-phenylethanol (Example 7), color and flavor, as desired, and water q.s. 15 ml. are added; the product is mixed well and homogenized.

EXAMPLE 28

*Liquid (syrup) 25 mg. per teaspoon.*—25 mg. of the citrate of 1-[p-(β-diethylaminoethoxy)phenyl]-1-p-tolyl-2-phenylethanol (Example 7) is dissolved in one ml. of water. Five mg. of sodium benzoate, 3.5 ml. of liquid sugar, 5 mg. of citric acid, and 0.375 mg. of butoben are added and stirred until dissolved, using gentle heat if necessary. Flavor, as desired, and water q.s. are then added.

EXAMPLE 29

*Liquid (syrup) 500 mg. per tablespoon.*—500 mg. of the citrate of 1-[p-(β-diethylaminoethoxy)phenyl]-1-p-tolyl-2-phenylethanol (Example 7) and 4.5 mg. of sugar are dissolved in sufficient water so that after the addition of 2.25 ml. of alcohol USP and flavor as desired, the volume is 15 ml.

EXAMPLE 30

*Injectable solution, 100 mg. per ml.*—100 mg. of the citrate of 1-[p-(β-diethylaminoethoxy)phenyl]-1-phenyl-2-p-anisylethanol (Example 1) and water for injection q.s. one ml. are mixed and warmed gently till solution is accomplished. The solution is filtered through an 03 porosity Selas filter, using sterilized equipment under aseptic conditions, and is used freshly make-up for injection.

EXAMPLE 31

*1% ointment.*—To a melt of 1.5 lbs. of propylene glycol 6.68 lbs. of polyethyleneglycol 400 USP and 6.68 lbs. of carbowax 4000 USP is added 0.15 lb. of micropulverized 1-[p-(β-diethylaminoethoxy)phenyl] -1 - p - chlorophenyl-2-p-anisylethanol (Example 6). The product is stirred until almost solid and milled if necessary to a smooth ointment. Fill in suitable containers.

EXAMPLE 32

*10% ointment.*—To a melt of 1.5 lbs. of propylene glycol, 6 lbs. of polyethylene glycol 400 USP and 6 lbs. carbowax 4000 USP is added 1.5 lbs. of micropulverized 1-[p-(β-diethylaminoethoxy)phenyl]-1-p-chlorophenyl-2-p-anisylethanol (Example 6). The product is stirred until almost solid and milled if necessary to a smooth ointment. Fill in suitable containers.

The other compounds of Examples 1 to 21 can be also used to prepare pharmaceutical preparations such as those of Examples 22 to 32.

This application is a continuation-in-part of our applications, Serial No. 599,343, filed July 23, 1956; Serial No. 643,912, filed March 5, 1957; and Serial No. 620,570, filed November 6, 1956, which are now abandoned.

We claim:

1. Compounds of the formula

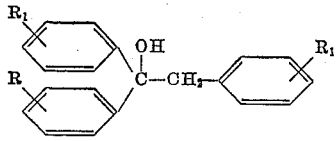

wherein R is a group of the formula —$OC_nH_{2n}A$, attached by the oxygen atom to the benzene ring in one of the positions meta and para to the point of attachment of the benzene ring to the carbon atom of the straight chain group, wherein $n$ is an integer of 2 to 4 and A is selected from the group consisting of amino, alkylamino in which the alkyl group contains from 1 to 4 carbon atoms and dialkylamino in which the alkyl groups contain from 1 to 4 carbon atoms, and wherein the $R_1$ groups are selected from the group consisting of hydrogen, halogen, methyl and methoxy at least one of said groups is selected from halogen, methyl and methoxy.

2. 1-[p - ($\beta$ - diethylaminoethoxy)phenyl] - 1 - phenyl-2-p-anisylethanol.

3. 1-[p - ($\beta$-diethylaminoethoxy)phenyl] - 1 - p - tolyl-2-phenylethanol.

4. 1-[p-($\beta$-diethylaminoethoxy)phenyl] - 1 - p - tolyl-2-p-chlorophenylethanol.

References Cited in the file of this patent

UNITED STATES PATENTS

| | | |
|---|---|---|
| 2,430,891 | Shelton et al. | Nov. 18, 1947 |
| 2,571,954 | Shelton et al. | Oct. 16, 1951 |
| 2,668,856 | Morrin | Feb. 9, 1954 |
| 2,670,375 | Stoughton | Feb. 23, 1954 |
| 2,759,975 | Chiddix et al. | Aug. 21, 1956 |
| 2,760,978 | Huebner | Aug. 28, 1956 |

FOREIGN PATENTS

| | | |
|---|---|---|
| 586,493 | Great Britain | Mar. 20, 1947 |